United States Patent
Kobayashi et al.

(10) Patent No.: US 7,600,938 B2
(45) Date of Patent: Oct. 13, 2009

(54) REFILL FOR CORRECTION PEN AND REFILL UNIT

(75) Inventors: Kyoko Kobayashi, Fujioka (JP); Makoto Ono, Fujioka (JP); Akira Fukai, Fujioka (JP); Takao Koyama, Fujioka (JP); Hitoshi Nakamura, Fujioka (JP); Kei Omoto, Fujioka (JP); Tadashi Koriki, Fujioka (JP)

(73) Assignee: Mitsubishi Pencil Co., Ltd., Shinagawa-Ku, Tokyo (JP)

( * ) Notice: Subject to any disclaimer, the term of this patent is extended or adjusted under 35 U.S.C. 154(b) by 595 days.

(21) Appl. No.: 10/548,125

(22) PCT Filed: Mar. 3, 2004

(86) PCT No.: PCT/JP2004/002601

§ 371 (c)(1),
(2), (4) Date: Sep. 2, 2005

(87) PCT Pub. No.: WO2004/078489

PCT Pub. Date: Sep. 16, 2004

(65) Prior Publication Data

US 2006/0075924 A1    Apr. 13, 2006

(30) Foreign Application Priority Data

Mar. 4, 2003 (JP) .............. 2003-057288
Mar. 4, 2003 (JP) .............. 2003-057290
Apr. 11, 2003 (JP) .............. 2003-107568

(51) Int. Cl.
*B43K 5/00* (2006.01)
*B43K 5/18* (2006.01)

(52) U.S. Cl. ................ 401/251; 401/222; 401/214; 401/188 A

(58) Field of Classification Search ............. 401/188 A, 401/188 R, 109–112, 216, 222, 251, 214
See application file for complete search history.

(56) References Cited

U.S. PATENT DOCUMENTS

| 5,888,008 | A | 3/1999 | Obersteller et al. |
| 6,027,272 | A | 2/2000 | Spencer et al. |
| 6,491,466 | B1 | 12/2002 | Eguchi et al. |
| 6,742,952 | B1 * | 6/2004 | Chen et al. ........... 401/192 |
| 2001/0048840 | A1 | 12/2001 | Spencer et al. |

FOREIGN PATENT DOCUMENTS

DE    44 09 756 A1    9/1995

(Continued)

OTHER PUBLICATIONS

English translation of PCT Written Opinion of the International Searching Authority issued in PCT/JP2004/002601.

(Continued)

*Primary Examiner*—David J Walczak
(74) *Attorney, Agent, or Firm*—Buchanan Ingersoll & Rooney PC

(57) ABSTRACT

A refill for a correction pen is constructed of a molded article of a polyamide resin obtained from monomers having an aromatic ring or a naphthene ring, a molded article of a blend of two or more kinds of polyamide resins, or a molded article having a multi-layered structure of two or more layers whose innermost layer in contact with the correction fluid is constituted of a polyamide resin. The applying part of a refill unit mounted on a ballpoint type applicator having a pressurizing mechanism in linkage with clicking action is formed by press fitting the rear end of a ballpoint pen tip having a rotatable ball to the attachment portion at the front end of an ink reservoir and a metal tube is squeezed to cover the outer periphery of the attachment portion at the front end of the ink reservoir to which the tip is fitted.

27 Claims, 10 Drawing Sheets

| FOREIGN PATENT DOCUMENTS | | |
|---|---|---|
| JP | 9-141180 A | 6/1997 |
| JP | 9-192582 A | 7/1997 |
| JP | 10-192770 A | 7/1998 |
| JP | 2000-263986 A | 9/2000 |
| JP | 2002-065351 A | 3/2002 |
| JP | 2002-067585 A | 3/2002 |
| JP | 2002-113985 A | 4/2002 |
| JP | 2003-145985 A | 5/2003 |

OTHER PUBLICATIONS

Supplementary Partial European Search Report issued Jul. 14, 2006 in corresponding EP 04 71 6767, EPO, Munich, Germany (in English).

Japanese language International Preliminary Report on Patentability (Chapter I of the PCT) dated May 25, 2004 in corresponding PCT/JP2004/002601.

* cited by examiner

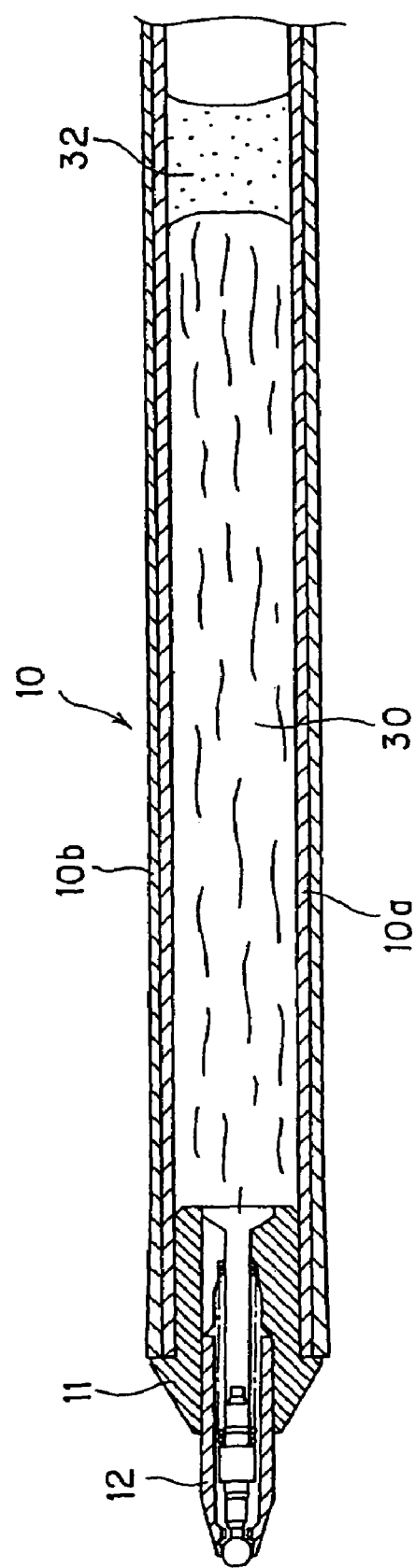

REFILL FOR CORRECTION PEN AND REFILL UNIT

TECHNICAL FIELD

The present invention relates to a refill for a correction pen which is excellent in transparency and visibility (clear drain ability) as well as relating to a synthetic resin-made refill unit which is mounted to an applicator such as a ballpoint type correction pen whose pen tip can be projected and retracted from the front part of the barrel by a clicking mechanism and which has a pressurizing mechanism in linkage with the clicking action.

BACKGROUND ART

Recently, in consideration of environmental issues, there is a demand for correction fluid containers for storing a correction fluid to be given in a so-called refillable form. To develop a correction fluid container into a refillable form, it is necessary to select a solvent resistant material because methyl cyclohexane, as the main solvent of the correction fluid, has high volatility. It is also necessary to select a material having such transparency that permits the remaining amount of the correction fluid to be monitored.

Conventionally, the correction fluid containers for correction pens are known to be formed by extrusion molding, blow molding, injection molding of nylon resin (c.f. Japanese Patent Application Laid-open 2002-65351) or formed of nylon 12 (c.f. Japanese Patent Application Laid-open 2002-67585), in order to obtain enhanced solvent resistance and inhibit swelling due to the solvent used and reduction of the solvent due to permeation, in comparison with polyethylene and polypropylene.

Molded articles of polyamide resin made from aliphatic monomers, such as nylon 12 and the like, described in these literatures, have solvent resistance, however do not have high enough transparency. Further, the correction fluid tends to adhere to the inner wall surface of the container and does not flow down as the correction fluid is consumed with application, so there are still problems in that the remaining amount cannot be correctly monitored and that it is difficult to use up the charged correction fluid completely.

On the other hand, concerning conventional ballpoint type writing instruments and applicators such as correction pens, some have free liquid type configurations in which ink or correction fluid is directly filled in the barrel, others have configurations in which ink or correction fluid is filled in an ink reservoir (refill) of a refill unit to be accommodated in the barrel. Either of these is configured such that the ballpoint pen tip is directly press fitted into the front end of the barrel or ink reservoir or that the tip holder having a ballpoint pen tip attached to the front part thereof is press fitted at its rear end into the front end of the barrel or ink reservoir filled up with ink.

The front part, of the synthetic resin-made barrel to which the tip holder is press fitted, or of the synthetic resin-made ink reservoir to which the tip is directly press fitted, is always under a condition of being internally stressed. Such a stress and an additional stress which may arise in the ballpoint pen tip during writing or application, in combination, would cause reduction of the press-fitting force on the tip holder or tip with the passage of time, leading to problems such as easy drop-off of the tip holder or tip and liability to ink leaking from the press fitting part.

In order to prevent ink leaking and drop-off of the tip holder of a free liquid type ballpoint pen in which ink is directly stored in a synthetic resin-made barrel, a technology has been known in that the front part of the barrel to which the rear end of the tip holder is press fitted is covered over its outer peripheral surface with a metal tube (c.f. Japanese Patent Application Laid-open 2002-113985).

However, the above configuration on its own, in which the front part of the barrel to which the rear end of the tip holder is press fitted is covered over its outer peripheral surface with a metal tube, cannot be expected to exert a sufficient effect, hence in the above publication the covering metal tube is adapted to be held between a flange of the tip holder and the front end of the barrel to achieve the expected effect.

Further, because of use of the tip holder, parts increase in number, resulting in problems in view of processing accuracy and assembly precision.

Moreover, in a refill unit which has a tip directly press fitted to a synthetic resin-made ink reservoir and is mounted to a ballpoint type applicator whose pen tip can be projected and retracted from the front part of the barrel by a clicking mechanism and which has a pressurizing mechanism in linkage with the clicking action, an additional pressure from the rear end of the ink reservoir is further applied in combination with the internal stresses at the front part of the ink reservoir to which the tip is press fitted and stresses acting on the ballpoint tip during application, hence leading to problems of more likeliness of drop-off of the tip and leaking of correction fluid, than usual.

In view of the above problems in prior art, the present invention is to solve them. The first object is to provide a refill for a correction pen that stores a correction fluid having as the main solvent methyl cyclohexane, which is highly volatile, wherein the refill for a correction pen is excellent in solvent resistance and in transparency and visibility so that the correction fluid stored and its remaining amount can easily be monitered during usage and with the passage of time. The second object is to provide a refill unit which has a tip directly press fitted to a synthetic resin-made ink reservoir (refill) is mounted to an applicator such as a ballpoint type correction pen whose pen tip can be projected and retracted from the front part of the barrel by a clicking mechanism and which has a pressurizing mechanism in linkage with the clicking action, wherein the refill unit is simple in structure and reduced in number of parts and further can prevent the tip from dropping off from the ink reservoir and prevent leaking of ink, correction fluid or the like.

DISCLOSURE OF THE INVENTION

Under consideration of the problems of the conventional refill and refill unit for a correction pen and in order to solve them, the present inventors have found that a refill for a correction pen of the above first object can be obtained by constructing a refill for a correction pen that stores a correction fluid having at least methyl cyclohexane as the main solvent, of an molded articles of a resin having specific physical properties, and thus have completed a refill for a correction pen of the present invention. The present inventors also achieved completion of a refill unit of the present invention, which has a tip directly press fitted to a synthetic resin-made ink reservoir (refill) and is mounted to an applicator such as a ballpoint type correction pen whose pen tip can be projected and retracted from the front part of the barrel by a clicking mechanism, and which has a pressurizing mechanism in linkage with the clicking action, wherein the tip is fixed by press fitting and covering in such a manner as to cover the end face of the front end attachment portion of the ink reservoir.

Explicitly, the present invention is characterized by the following (1) to (18).

(1) A refill for a correction pen storing a correction fluid having at least methyl cyclohexane as the main solvent, characterized in that the refill for a correction pen is constructed of a molded article of a polyamide resin obtained from monomers having an aromatic ring or a naphthene ring.

(2) A refill for a correction pen storing a correction fluid having at least methyl cyclohexane as the main solvent, characterized in that the refill for a correction pen is constructed of a molded article of a blend of at least two kinds of polyamide resins (3) The refill for a correction pen as described in the above item (2), wherein one kind of polyamide resin is one that has an aromatic ring and/or a naphthene ring in the principal chain.

(4) The refill for a correction pen as described in the above item (2) or (3), wherein a blend of an aliphatic base polyamide resin and a polyamide resin having an aromatic ring and/or naphthene ring in the principal chain is used.

(5) The refill for a correction pen as described in any one of the above items (2) to (4), wherein the polyamide resin having an aromatic ring and/or a naphthene ring in the principal chain is blended in an amount of 5 to 100% by weight.

(6) A refill for a correction pen storing a correction fluid having at least methyl cyclohexane as the main solvent, characterized in that the refill for a correction pen is configured of a multi-layered structure having two or more layers and the innermost layer in contact with the correction fluid is constituted of a polyamide resin.

(7) The refill for a correction pen as described in the above item (6), wherein the polyamide resin layer of the innermost layer is constituted of a polyamide resin layer having an aromatic ring and/or a naphthene ring in the principal chain.

(8) The refill for a correction pen as described in the above item (6) or (7), wherein the structure comprises at least one layer of ethylene-vinyl alcohol copolymers.

(9) The refill for a correction pen as described in above items (8), wherein a mol ratio of ethylene in the ethylene-vinyl alcohol copolyer is 10 to 60 mol %.

(10) The refill for a correction pen as described in any one of the above items (6) to (9), wherein the outermost layer is constituted of a polymer layer having a water vapor permeability of 5 g/m$^2$·day/25 μm (40° C., 90% RH) or less.

(11) The refill for a correction pen as described in the above item (10), wherein the outermost layer is constituted of a polypropylene or a poly-cyclicolefin.

(12) The refill for a correction pen as described in any one of the above items (6) to (11), wherein a thickness of the polyamide resin layer of the innermost layer is 0.01 to 2 mm.

(13) A refill for a correction pen as described in any one of the above items (6) to 7, wherein the multi-layered refills for a correction pen are produced by co-extrusion, injection molding or blow molding.

(14) A refill unit comprising an applying part at the front end and an ink reservoir at the rear, wherein the refill unit is mounted in a barrel so as to be urged to the rear by a first spring;

the applying part of the refill unit is adapted to be able to project and retract in link with protruding and protrusion-canceling actions by a clicking mechanism provided at the rear end of the barrel;

the ink reservoir of the refill unit is made open at the rear end, and the barrel is provided with a pressurizing mechanism for enhancing the inner pressure of the ink reservoir arranged between the rear end of the ink reservoir and the clicking mechanism; and, the pressurizing mechanism comprises a sealing part, a front-end open sleeve and a second spring for repulsively urging the sealing part and the sleeve in mutually separating directions; and when the refill unit is pushed back by pressing the top of the applying part projected from barrel after the protruding action of the clicking mechanism is done, the sleeve of the pressurizing mechanism advances relative to the sealing part to thereby compress the air inside the ink reservoir, and wherein the refill unit is characterized in that the applying part is formed by press fitting the rear end of a ballpoint pen tip having a rotatable ball to the attachment portion at the front end of the ink reservoir and that a metal tube is squeezed to cover the outer periphery of the front end attachment portion of the ink reservoir to which the tip is fitted.

(15) A refill unit characterized in that the ink reservoir of the refill unit is one of the refills for a correction pen described in any one of the above item(s).

(16) The refill unit as described in the above item(s), wherein the ballpoint pen tip has a metal ball at the front end and a metal holder and is constituted such that the ball is pressed from the backside thereof by a pressing means comprising a spring element so as to bring the ball into tight contact with the inner rim of a ball holding portion at the front end of the tip.

(17) The refill unit as described in any one of the above item(s), wherein a metal tube whose one end face is narrowed is squeezed and fixed over the outer periphery of the attachment portion at the front end of the ink reservoir to which the tip is press fitted so as to cover the end face of the attachment portion at the front end of the ink reservoir.

(18) The refill unit as described in any one of the above item(s), wherein the metal tube is squeezed and fixed to a projection or undercut formed on the outer periphery of the attachment portion at the front end of the ink reservoir to which the tip is press fitted.

BRIEF DESCRIPTION OF THE DRAWINGS

FIG. 3 illustrates one example of an embodiment of a refill for a correction pen in the present invention (the third invention) and is a vertical sectional view showing a configuration (refill unit) where a ballpoint pen tip is attached to a multi-layered refill for a correction pen.

FIG. 5 is an illustration showing a state in operation (during writing) and FIG. 6 is an illustration showing a state in non-operation (during non-writing) instead of FIG. 5.

BEST MODE FOR CARRYING OUT THE INVENTION

Next, the embodiment of a refill for a correction pen and a refill unit of the present invention will be described in detail step by step along with the drawings.

The refill for a correction pen of the present invention is one that comprises any one of the following (1) to (3).

(1) A refill for a correction pen stores a correction fluid having at least methyl cyclohexane as the main solvent and is characterized in that the refill for a correction pen is constructed of a molded article of polyamide resin obtained from monomers having an aromatic ring or a naphthene ring (this will be referred to as "the refill for a correction pen of the first invention").

(2) A refill for a correction pen stores a correction fluid having at least methyl cyclohexane as the main solvent and is characterized in that the refill for a correction pen is constructed of a molded article of a blend of at least two kinds of polyamide resins (this will be referred to as "the refill for a correction pen of the second invention").

(3) A refill for a correction pen stores a correction fluid having at least methyl cyclohexane as the main solvent and is characterized in that the refill for a correction pen is configured of a multi-layered structure having two or more layers and in that the innermost layer in contact with the correction fluid is constituted of a polyamide resin (this will be referred to as "the refill for a correction pen of the third invention").

Figure 1:
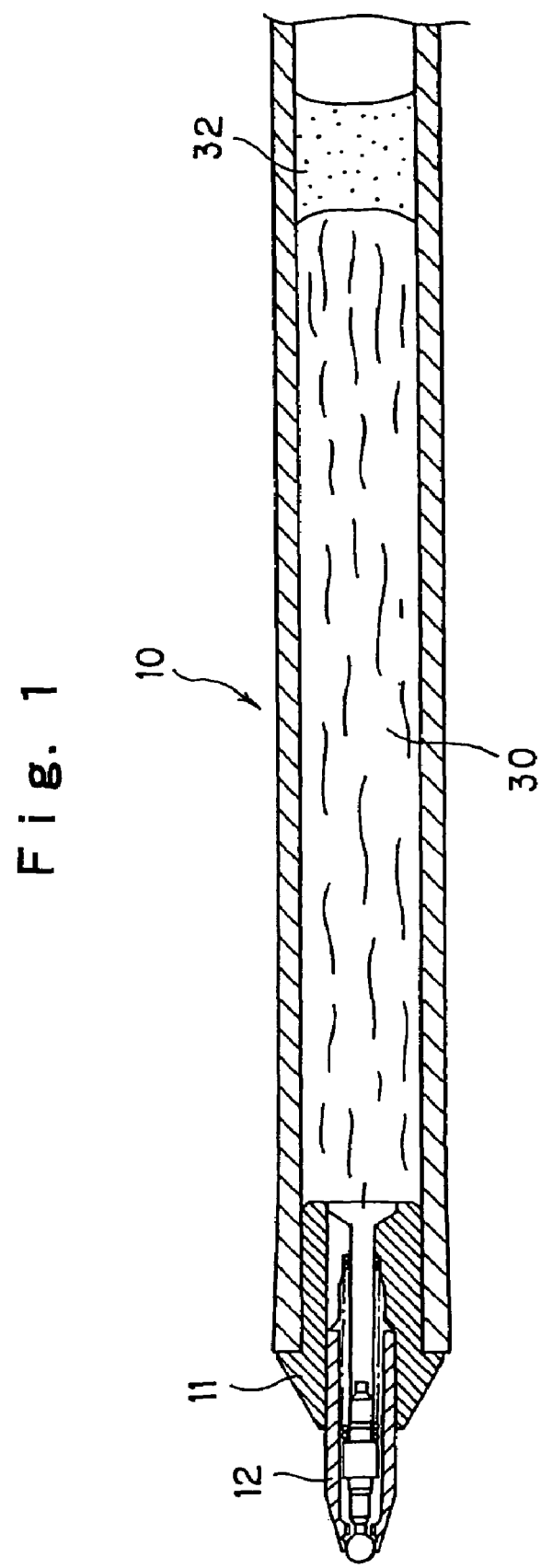
FIG. 1 illustrates one example of an embodiment of a refill for a correction pen in the present invention (the first or second invention) and is a vertical sectional view showing a configuration (refill unit) where a ballpoint pen tip is attached to a refill for a correction pen.

FIG. 1 is a view showing one example of an embodiment of a refill for a correction pen of the first or second invention. This refill for a correction pen 10 stores therein a correction fluid 30 having at least methyl cyclohexane as the main solvent while a correction fluid follower 32 is placed in contact with the rear end of correction fluid 30. Further, a ballpoint pen tip 12 as an applying (writing) part is attached to the front end of refill for a correction pen 10 with a joint (member) 11 in between to form a refill unit.

Figure 2:
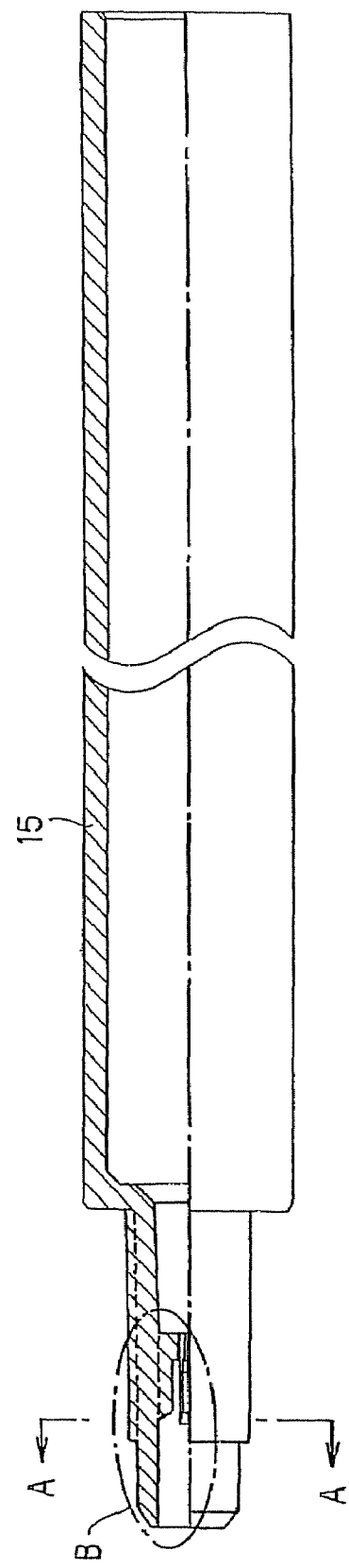
FIG. 2(a) illustrates a partial vertical section of an embodiment of a refill for a correction pen in the present invention (the first invention or second invention).
FIG. 2(b) is a sectional view cut along line A-A of FIG. 2(a).
FIG. 2(c) is an enlarged vertical section of the B-portion of FIG. 2(a).
Figure 2:
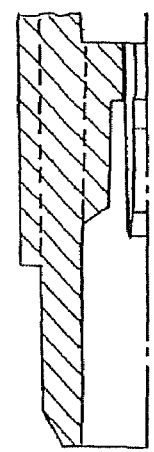
Figure 2:
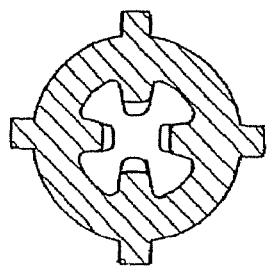

FIG. 2 illustrates another example of the embodiment of a refill for a correction pen in the present invention, (a) a partial vertical section, (b) a sectional view cut along line A-A, (c) an enlarged vertical section of the B-portion.

This refill for a correction pen 15 is one that has an integrally molded joint (member) as shown in FIG. 2. Though not illustrated, this refill for a correction pen 15, as described above, stores therein a correction fluid having at least methyl cyclohexane as the main solvent while a correction fluid follower is placed in contact with the rear end of the correction fluid.

This refill for a correction pen 10 or 15 is constructed of a molded article of a polyamide resin obtained from monomers having an aromatic ring or a naphthene ring, or a molded article of a blend of two or more kinds of polyamide resins.

The polyamide resin obtained from monomers having an aromatic ring as the raw material is one that has an aromatic ring in the principal chain and includes, for example, polymetaxylylene adipamide resin, a copolymer of telephthalic acid or isophthalic acid and hexamethylene diamine, and others. Specifically, capable of using are commercial products such as NOVAMID X21 (manufactured by Mitsubishi Engineering-Plastics Corporation), Nylon MXD6 (manufactured by MITSUBISHI GAS CHEMICAL COMPANY, LTD.), SELAR PA (manufactured by DuPont), TROGAMID T5000 (manufactured by Daicel-Huels, Ltd.).

A polyamide resin obtained from monomers having a naphthene ring as the raw material is one that has a naphthene ring in the principal chain. Specifically, as a commercial resin having a naphthene ring and high transparency, TROGAMID CX-7323 (manufactured by Daicel-Huels, Ltd.) can be used.

As for the resin that comprises a blend of two or more kinds of polyamide resins in the second invention, two or more kinds of polyamide resins having different physical properties may be blended, and in view of the better moldability and visibility than the single polyamide resin in the above first invention, one of the polyamide resins is preferably a polyamide resin having an aromatic ring and/or a naphthene ring in the principal chain. More preferable is use of a blend of an aliphatic polyamide resin and a polyamide resin having an aromatic ring and/or a naphthene ring in the principal chain.

The polyamide resin having an aromatic ring in the principal chain in the second invention has better, persistent clear drain ability against a correction fluid having at least methyl cyclohexane as the main solvent than the single polyamide resin obtained from monomers having an aromatic ring or a naphthene ring in the first invention does, however it is slightly inferior in terms of moldability and mechanical strength at low temperatures. On the other hand, an aliphatic polyamide resin is relatively cheap and excellent in moldability, but is somehow milk-white due to its clear drain ability and its own crystallization so that it is slightly inferior in visibility.

In consideration of this, in a particularly preferred mode of the second invention where a blend of two or more kinds of polyamide resins are used, use of a blend of a polyamide resin having an aromatic ring and/or a naphthene ring in the principal chain and an aliphatic polyamide resin is preferred. When this resin blend is used, the polyamide resin having an aromatic ring and/or a naphthene ring in the principal chain is preferably blended in an amount of 5 to 100% by weight, more preferably 30 to 100% by weight relative to the total amount of the blend resin.

If the amount of the polyamide resin having an aromatic ring and/or a naphthene ring in the principal chain is lower than 5% by weight, it is impossible to expect improvement of persistent clear drain ability. Use of the resin in the amount of 100% by weight means a blended resin of a polyamide resin having an aromatic ring in the principal chain and a polyamide resin having a naphthene ring in the principal chain.

As the usable polyamide resin having an aromatic ring and/or a naphthene ring in the principal chain, all the polyamide resins mentioned in the above first invention can be used.

Further, as the aliphatic polyamide resin, inexpensive aliphatic polyamide resins such as nylon 6, nylon 66, nylon 11, nylon 12 and others can be used.

Refill for a correction pen 10 or 15 of the first or second invention can be easily obtained by extrusion molding, injection molding, blow molding or other processing of the aforementioned polyamide resin obtained from monomers having an aromatic ring or a naphthene ring, or a blend of two or more kinds of polyamide resins, preferably a blend of a polyamide resin having an aromatic ring and/or a naphthene ring in the principal chain, more preferably a blend of a polyamide resin having an aromatic ring and/or a naphthene ring in the principal chain and an aliphatic polyamide resin.

Though the wall thickness of the refill for a correction pen 10 or 15 of the present invention may vary depending on the correction pen structure, the correction fluid type and other factors, it is preferably specified to be 0.1 to 3 mm, more preferably 0.2 to 1.5 mm.

A thickness of less than 0.1 mm results in poor mechanical strength while a thickness exceeding 3 mm is not preferred because of being too thick and resulting in a thick pen body and being costly.

FIG. 3 shows one example of an embodiment of a refill for a correction pen according to the third invention. This refill for a correction pen 10 stores therein a correction fluid 30 having at least methyl cyclohexane as the main solvent while a correction fluid follower 32 is placed in contact with the rear end of correction fluid 30. Further, a ballpoint pen tip 12 as an applying (writing) part is attached to the front end of refill for a correction pen 10 with a joint (member) 11 in between to form a refill unit.

Figure 4A:
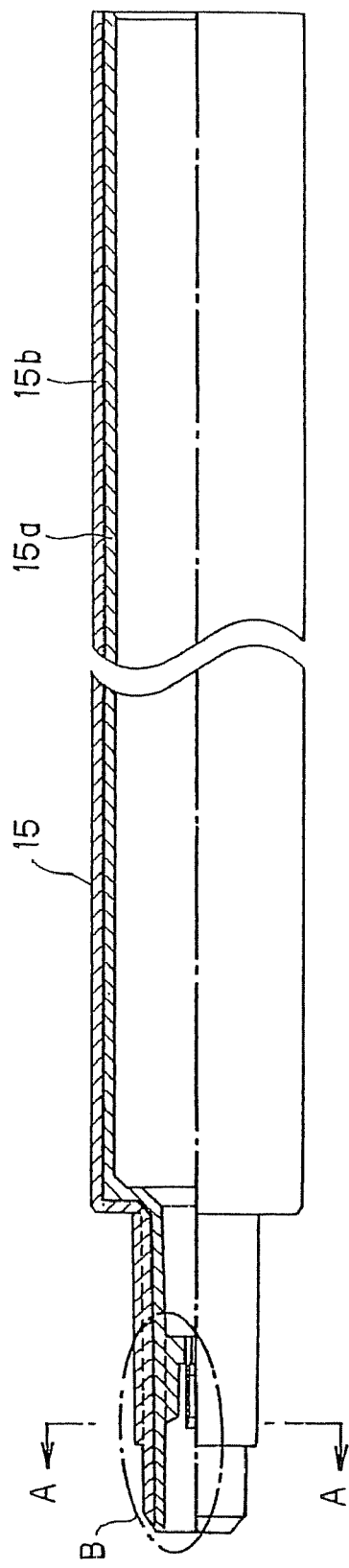
FIG. 4(a) illustrates a partial vertical section of a multi-layered refill for a correction pen in the present invention (the third invention).
Figure 4C:
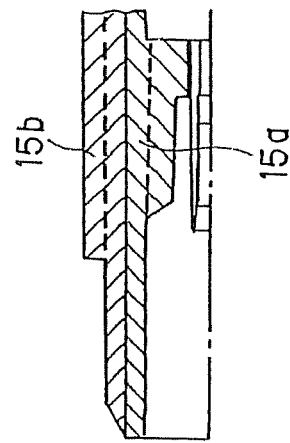
FIG. 4(c) is an enlarged vertical section of the B-portion of FIG. 4(a).
Figure 4B:
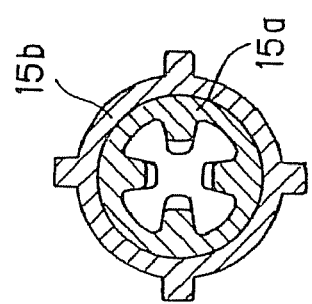
FIG. 4(b) is a sectional view cut along line A-A of FIG. 4(a).

FIG. 4 illustrates another example of the embodiment of a refill for a correction pen in the third invention, (a) a partial vertical section, (b) a sectional view cut along line A-A, (c) an enlarged vertical section of the B-portion.

This refill for a correction pen 15 is one that has an integrally molded joint (member) as shown in FIG. 4. Though not illustrated, this refill for a correction pen 15, as described above, stores therein a correction fluid having at least methyl cyclohexane as the main solvent while a correction fluid follower is placed in contact with the rear end of the correction fluid.

This refill for a correction pen 10 or 15 has a multi-layered structure of two or more layers and its innermost layer 10a or 15a in contact with a correction fluid 20 is constituted of a polyamide resin. Illustrated examples of refill for a correction pen 10 or 15 in FIG. 3 and FIG. 4 have two layers (not including an adhesive layer), and the outer layer 10b or 15b may be constituted of any number of layers as long as the innermost layer 10a or 15a is constituted of a polyamide resin.

The polyamide resin that constitutes this innermost layer 10a or 15a is not particularly limited as long as it belongs to the polyamide base resin category. However, use of a polyamide resin having an aromatic ring and/or a naphthene ring in the principal chain is preferred to use of an aliphatic polyamide resin such as nylon 12, because of their excellency in solvent resistance and visibility. Further, from a moldability viewpoint, a blend of these resins and the aforementioned aliphatic polyamide resin can be used.

Examples of usable aliphatic polyamide resins in the third invention include nylon 6, nylon 66, nylon 11 and nylon 12, which are inexpensive.

Further, the usable polyamide resins having an aromatic ring and/or a naphthene ring in the principal chain are particularly preferred for the refill for a correction pen in view of their superiority in solvent resistance and visibility to nylon 12 and the like, but they exhibit slight inferiority in terms of moldability and mechanical strength at low temperatures, hence involving some problems on single usage. For these reasons, preferred use of the polyamide resin having an aromatic ring and/or a naphthene ring in the principal chain, which has the aforementioned excellent characteristics, is made as the innermost layer formed as a thin layer in order to solve the above usage problem while another polymer layer is formed as the outer layer to configure a multi-layered structure, whereby it is possible to achieve the enhanced effect of the present invention.

The usable polyamide resins having an aromatic ring in the principal chain include those having an aromatic ring in the principal chain, for example, polymetaxylylene adipamide resin, copolymers of telephthalic acid or isophthalic acid and hexamethylene diamine. Specifically, commercial products such as NOVAMID X21 (manufactured by Mitsubishi Engineering-Plastics Corporation), Nylon MXD6 (manufactured by MITSUBISHI GAS CHEMICAL COMPANY, LTD.), SELAR PA (manufactured by DuPont), TROGAMID T5000 (manufactured by Daicel-Huels, Ltd.) can be used.

A polyamide resin obtained from monomers having a naphthene ring is one that has a naphthene ring in the principal chain. Specifically, as a commercial product having a naphthene ring and high transparency, TROGAMID CX7323 (manufactured by Daicel-Huels, Ltd.) can be used.

As for the resin that comprises a blend of two or more kinds of polyamide resins in the third invention, two or more kinds of polyamide resins having different physical properties may be blended, and in view of improvement in persistent clear drain ability and moldability, a blend of a polyamide resin having an aromatic ring in the principal chain and a polyamide resin having a naphthene ring in the principal chain or a blend of these polyamide resins having an aromatic ring and/or a naphthene ring in the principal chain and an aliphatic polyamide resin is preferably used. When the resin blend is used, a polyamide resin having an aromatic ring and/or a naphthene ring in the principal chain is preferably blended in an amount of 5 to 100% by weight, more preferably 30 to 100% by weight relative to the total amount of the resin blend.

The thickness of the innermost layer, i.e., polyamide resin layer 10a is specified to be 0.01 to 2 mm, preferably 0.05 to 1 mm, particularly preferably 0.1 to 0.8 mm.

A thickness of less than 0.01 mm results in poor solvent resistance while a thickness exceeding of 2 mm is not preferable because of being too thick and resulting in a thick pen body and being costly.

In the third invention, when a polyamide resin having an aromatic ring and/or a naphthene ring in the principal chain or a blend of polyamides comprising those resins is used for the innermost layer 10a, a layer comprising an aliphatic polyamide resin such as nylon 6, nylon 66, nylon 11 or nylon 12, which is a cheaper polyamide based resin, may be used as the outer layer 10b or 15b on the outside of the aforementioned polyamide resin innermost layer 10a or 15a, taking into account the adhesive affinity with the inner layer polyamide. Alternatively, a polyester-based polymer such as polyethylene terephthalate (PET) and polyethylene naphthalate (PEN), a polyolefin-based polymer such as polypropylene (PP), polyethylene (PE) or poly-cyclicolefin may be used for configuring a multi-layered structure, using an adhesive polyolefin as an adhesive layer.

Also in the third invention, at least one layer of ethylene-vinyl alcohol copolymer (EVOH), which is a resin having excellent solvent resistance to solvents such as methyl cyclohexane and excellent gas barrier ability against oxygen and nitrogen gases, is preferably involved. It is particularly preferred that at least one layer (of the three-layered configuration in total) of the copolymer is formed as an intermediate layer between the innermost layer and the outermost layer.

The ethylene-vinyl alcohol copolymer to be used is preferably one whose copolymerization ratio of ethylene in an ethylene-vinyl alcohol copolymer falls within a range of 10 to 60 mol %, in view of improved solvent resistance and gas barrier ability.

Included as the examples of EVOH whose copolymerization ratio of ethylene falls within a range of 20 to 60 mol %, are EP-F101 (copolymerization ratio of ethylene:32 mol %, manufactured by KURARAY CO., LTD.), EP-H101 (copolymerization ratio of ethylene:38 mol %, manufactured by KURARAY CO., LTD.), EP-E105 (copolymerization ratio of ethylene:44 mol %, manufactured by KURARAY CO., LTD.), EP-G156 (copolymerization ratio of ethylene:47 mol %, manufactured by KURARAY CO., LTD.), EP-G110 (copolymerization ratio of ethylene:47 mol %, manufactured by KURARAY CO., LTD.), SOARNOL D2908 (copolymerization ratio of ethylene:29 mol %, manufactured by The Nippon Synthetic Chemical Industry Co., Ltd.), SOARNOL D3203 (copolymerization ratio of ethylene:32 mol %, manufactured by The Nippon Synthetic Chemical Industry Co., Ltd.), SOARNOL D2903 (copolymerization ratio of ethylene:29 mol %, manufactured by The Nippon Synthetic Chemical Industry Co., Ltd.,), SOARNOL D3808 (copolymerization ratio of ethylene:38 mol %, manufactured by The Nippon Synthetic Chemical Industry Co., Ltd.), SOARNOL ET3803 (copolymerization ratio of ethylene:38 mol %, manufactured by The Nippon Synthetic Chemical Industry Co., Ltd.), SOARNOL A4412 (copolymerization ratio of ethylene:44 mol %, manufactured by The Nippon Synthetic Chemical Industry Co., Ltd.), and SOARNOL AT4403 (copolymerization ratio of ethylene:44 mol %, manufactured by The Nippon Synthetic Chemical Industry Co., Ltd.).

When the EVOH layer is used, the thickness is preferably specified to be 0.01 to 1 mm, more preferably 0.1 to 0.5 mm.

In order to make the refill for a correction pen excellent in hygroscopicity resistance, the outermost layer is desirably constituted of a polymer layer having a water vapor permeability of 5 g/m$^2$·day/25 µm (40° C., 90% RH) or less, preferably having a water vapor permeability of 3 g/m$^2$·day/25 µm (40° C., 90% RH) or less.

As the material for the outermost layer having the properties, polypropylene, polyethylene, poly-cyclicolefin or a blended resin of two or more of these resins can be listed.

Included as the poly-cyclicolefin are cyclicolefin copolymers having the combined properties of a polyolefin resin and an amorphous resin, specifically, APEL series (APL6509T, APL6013T, APL6011T, APL6015T, APL8008F, APL8009T, APL5014DP, manufactured by Mitsui Chemicals, Inc.), or ZEONOR1020R (TOHCELLO CO., LTD.) as well as a cyclicolefin resin, which is an amorphous polyolefin and made from dicyclopentadien in the C5 fraction as a main raw material, specifically, ZEONEX and ZEONOR (manufactured by ZEON CORPORATION).

In connection with the above, when the above EVOH layer is provided, the EVOH layer has slightly poor hygroscopicity resistance than other polymers, so that it is preferred that a polymer layer having a water vapor permeability equal to or lower than the above is formed as the outer layer of EVOH.

The aforementioned EVOH layer and the polymer layer having a water vapor permeability equal to or lower than 5 g/m$^2$·day/25 µm (40° C., 90% RH) may be used for configuring multi-layered structures, using appropriate adhesive layers, respectively, so as to produce excellent effects.

As stated heretofore, the refill for a correction pen of the third invention is configured of a multi-layered structure having two or more layers and can be readily produced by co-extrusion molding, co-blow molding, co-injection molding some resins for the innermost and outermost layers in combination in a suitable manner, wherein the innermost layer that is in contact with the correction fluid is constituted of a polyamide resin, preferably a polyamide resin having an aromatic ring and/or a naphthene ring in the principal chain or a blend of these resins and an aliphatic polyamide resin and the outermost layer (including the intermediate layer) is constituted of an aliphatic polyamide resin such as nylon 12, polyester based polymer, polyolefin based polymer, EVOH or a polymer with its water vapor permeability lower than the aforementioned characteristic value and further an adhesive resin constituting an adhesive layer is used as required. Particularly, co-extrusion molding is preferred because it can configure a multi-layered structure at the time of molding.

Though the wall thickness of refill for a correction pen 10 or 15 of the third invention may vary depending on the correction pen structure, the correction fluid type, the thickness of the polyamide resin of the aforementioned innermost layer and other factors, it is preferably specified to be 0.5 to 3 mm, more preferably 1 to 2 mm.

In the first to third inventions, correction fluid 30 storeed in refill for a correction pen 10 or 15 shall not be particularly limited as long as it has a conventionally used correction fluid composition, and for example, used is a correction fluid prepared by suitably dissolving or dispersing a masking agent such as titanium dioxide or the like, an organic solvent comprising at least methyl cyclohexane as the main solvent (in an amount equal to or greater than 50% by weight in the solvent), a thickner soluble in the organic solvent, a resin serving as a binder, surfactants and other optional components.

As a solvent usable other than methyl cyclohexane described above, n-hexane, n-heptane, n-octane, iso-octane, cyclohexane, ethyl cyclohexane, toluene, xylene and the like can be listed.

As for the content of each component in the correction fluid, a preferred composition may comprise 20 to 85% by weight of the organic solvent, 10 to 60% by weight of the masking agent, 5 to 30% by weight of resins and other components based on the total amount of the correction fluid (100% by weight).

The above correction fluid may be used as it is, or may be used as a gel type correction fluid (viscous fluid) prepared by adding a viscosity-providing agent such as fine powder silica, alumina, dibenzylidene sorbitol, organically processed bentonite, 12-hydroxystearic acid and its derivatives, hardened castor oil and its derivatives, N-lauroyl-L-glutamic acid-α, γ-di-n-butyramide, paraffin wax and polyethylene wax, to the above correction fluid in an amount of about 0.1 to 10% by weight. Preparation of gel-like correction fluid inhibits titanium oxide from precipitating to enable it to be handled without stirring. Further, when the correction fluid is applied things to be applied such as paper, it is possible to inhibit "blurring" on the applied things owing to its structural viscosity.

In the refills for a correction pen of the first to third inventions, the correction fluid follower 32 placed in contact with the rear end of correction fluid 30 comprises a slightly volatile fluid that is incompatible with correction fluid 30 and placed in contact with the rear end of the aforementioned correction fluid, and serves as a movable plug as it moves following the correction fluid consumed.

This slightly volatile fluid constituting correction fluid follower 32 shall not be particularly limited as long as it has two basic properties, i.e., preventing evaporation of the correction fluid without being compatible with the correction fluid and, and being hard to evaporate by itself. For example, included is one (alone or mixture of two substances) selected from glycerin, diglycerin, polyglycerin, polyethylene glycol, polypropylene glycol, alkylene glycol alkyl ether, polyglycerin fatty acid ester, alkylene oxide adduct of glycerin, alkylene oxide adduct of diglycerin and alkylene oxide adduct of polyglycerin.

Further, in order to enhance the performance of correction fluid follower 32, a structural viscosity-providing agent such as fine powder silica, alumina, a mixture of those, dibenzylidene sorbitol and the like may be added to the aforementioned fluid to form a gel-like fluid.

The applying (writing) portion shall not be particularly limited as long as it has a structure in which a suitable amount of the correction fluid can be ejected. For instance, as shown in FIG. 1 or FIG. 3, it can be constituted of a ballpoint pen tip 12 having a metal (stainless or ceramic) ball and a metal (stainless or ceramic) holder at the front end, and the ball in the pen tip is urged by a pressing means made from a spring element so that the ball can be kept in tight contact with the inner rim of the ball holding portion at the top of the tip. In the case of the pen tip having the pressing means, the ball sinks during application, etc., so as to form clearance between the ball and the ball holding portion so that a suitable amount of the correction fluid can be discharged from refill 10 or 15 passing through the clearance to the outside for application. When application work finishes (in a normal state), the ball is brought back by the pressing means into tight contact with the inner rim of the ball holding portion at the top of the tip, causing such a condition that the correction fluid will not flow out.

Figure 5:
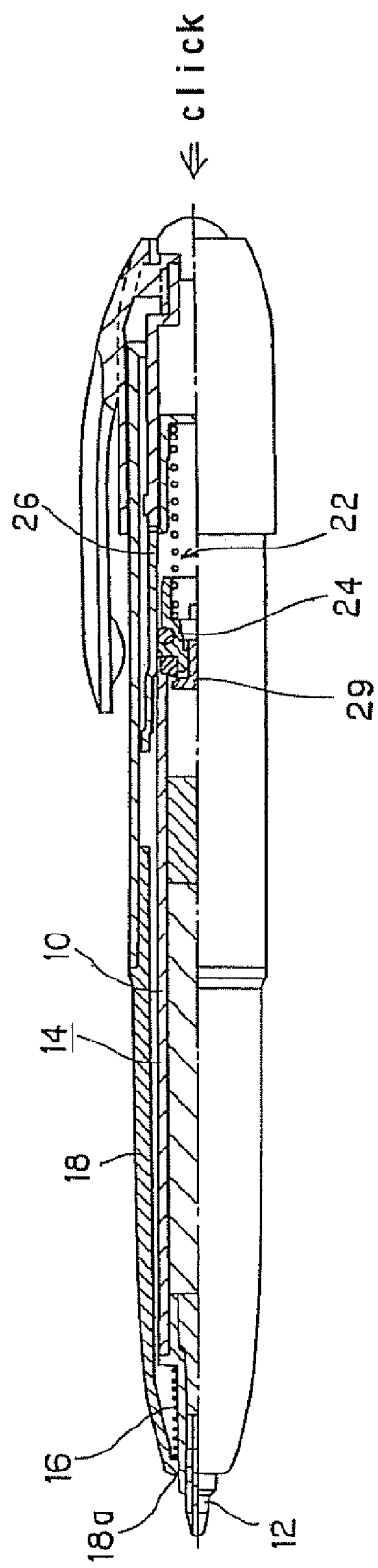
FIGS. 5 and 6 are vertical half sectional views of an applicator in which a refill unit of the present invention is accommodated in the barrel.
Figure 6:
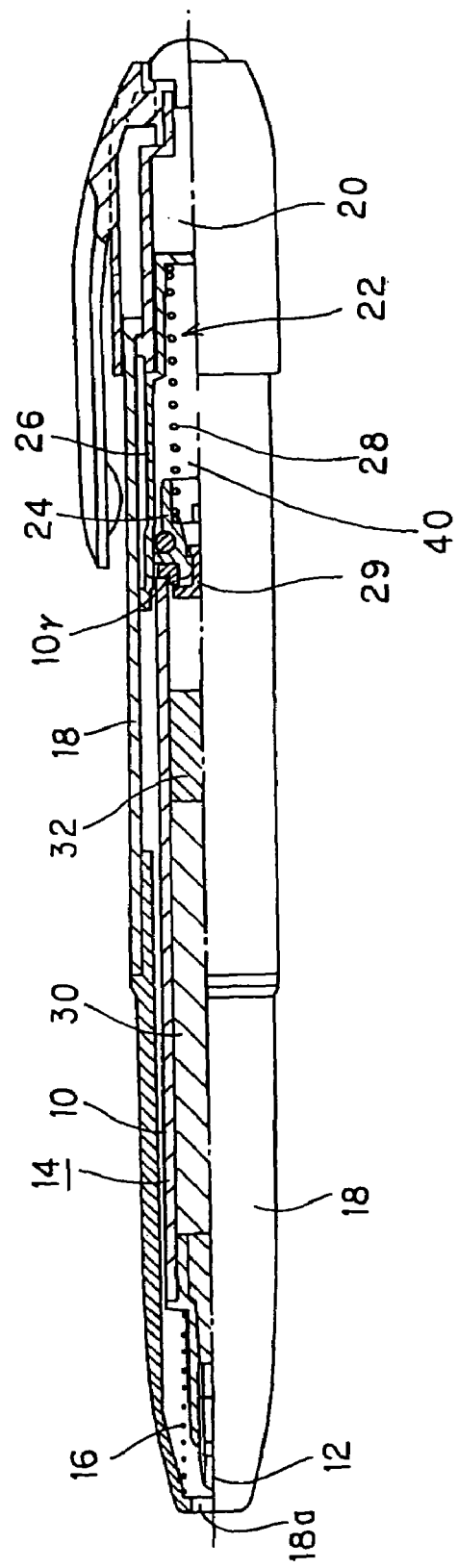

The refill for a correction pen of the first to third inventions are accommodated and used in, like conventional ballpoint pens, for example, a correction pen in which the refill is detachably fixed by screw fitting or the like with its joint (front barrel) to the main body (barrel body), or a clicking type ballpoint pen type correction pen having a pressurizing pumping mechanism disclosed in Japanese Patent Application Laid-open 2000-335173, filed by the present applicant, or an applicator illustrated in FIGS. 5 and 6 described below.

In accordance with the refill for a correction pen of the first invention thus configured and used, the refill for a correction pen storing a correction fluid having at least methyl cyclohexane as the main solvent is constructed of a molded article of a polyamide resin obtained from monomers having an aromatic ring or a naphthene ring, whereby it is possible to achieve excellent solvent resistance and make the correction fluid of the content and its remaining amount easily visible during usage and as time passes.

In the refill for a correction pen of the second invention, the refill for a correction pen storing a correction fluid having at least methyl cyclohexane as the main solvent is constructed of a molded article of a blend of at least two kinds of polyamide resins, preferably a blend comprising as one component a polyamide resin having an aromatic ring and/or a naphthene ring in the principal chain, more preferably a blend of polyamide resin having an aromatic ring and/or a naphthene ring in the principal chain and an aliphatic polyamide resin, whereby it is possible to achieve excellent solvent resistance, permit better visibility (so as to make the correction fluid of the content and its remaining amount easily visible during usage and as time passes) and provide moldability.

Further, in the refill for a correction pen of the third invention, the refill for a correction pen storing a correction fluid having at least methyl cyclohexane as the main solvent is configured of a multi-layered structure having two or more layers and constructed such that the innermost layer in contact with the correction fluid is constituted of a polyamide resin, whereby it is possible to achieve excellent solvent resistance and make the correction fluid of the content and its remaining amount easily visible during usage and as time passes.

The refill for a correction pen of the present invention (the first to third inventions) are thus configured as above, and characterized by their refill structure. Accordingly, other constitution elements than the refill, such as the correction fluid, the correction fluid follower, the correction pen structure and the like, shall not be particularly limited, hence various modifications can be added without departing the scope of the features of the refill for a correction pen of the present invention. The preferred refill units using the refill for a correction pen of the first to third inventions are given in preferred forms described below.

Figure 7:
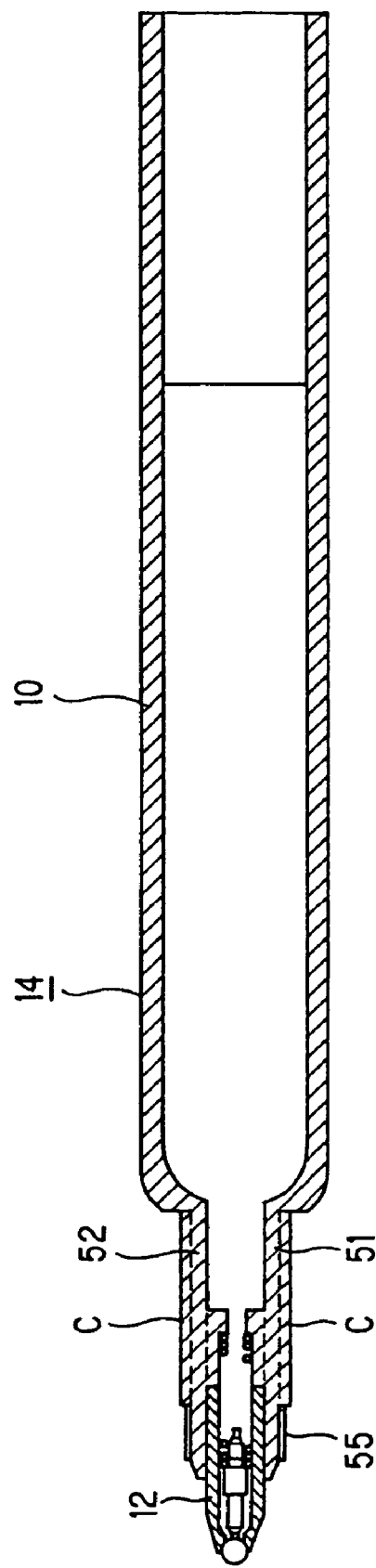
FIG. 7 is a vertical sectional view showing one example of a refill unit of the present invention.

Next, FIGS. 5 to 12 illustrate the embodiments of refill units of the present invention. FIG. 5 and FIG. 6 are vertical half sectional views of an applicator in which a refill unit according to the embodiment of the present invention is accommodated in the barrel, showing the states after and before clicking, respectively. FIG. 7 is a sectional view showing a refill unit. FIGS. 8 to 12 are essential sectional views showing various embodiments of refill units of the present invention.

A refill unit of the present invention is a refill unit constituted of a synthetic resin which is mounted to an applicator such as a ballpoint type correction pen whose pen tip can be projected and retracted from the front part of the barrel by a clicking mechanism and which has a pressurizing mechanism in linkage with the clicking action.

Illustratively, an applicator accommodating a refill unit of the present invention is configured as shown in FIGS. 5 and 6, for example: a refill unit 14 having a ballpoint pen tip 12 at the front end as an applying portion and an ink reservoir 10 at the rear is mounted inside a barrel 18 with it being urged rearward by a first spring 16; ballpoint pen tip 12 to be the applying portion of refill unit 14 can be projected from and retracted into the front end opening 18a in linkage with the protruding action and canceling action of a clicking mechanism 20 that is provided at the rear end of barrel 18; ink reservoir 10 of the aforementioned refill unit 14 is made open at its the rear end; a pressurizing mechanism 22 for increasing the inner pressure of ink reservoir 10 is provided between the ink reservoir rear end 10r and clicking mechanism 20; pressurizing mechanism 22 comprises a sealing part 24, a front-end open sleeve 26 and a second spring 28 for repulsively urging sealing part 24 and sleeve 26 in mutually separating directions; and when the top of ballpoint pen tip 12 of the applying portion projected from barrel 18 is pressed to retract refill unit 14 after the protruding action of the clicking mechanism 20 is done, the aforementioned sealing part 24 goes back and sleeve 26 relatively advances in pressurizing mechanism 22 to thereby compress the air in a pressuring chamber 40, whereby the pressurized air opens a check valve 29 to pressurize the interior of ink reservoir 10 through sealing part 24.

Also, in linkage with the protruding action by clicking mechanism 20, sealing part 24 of pressurizing mechanism 22 in barrel 18 comes into tight contact with ink reservoir rear end 10r of refill unit 14 and then sleeve 26 further moves forwards and compresses the air in pressurizing chamber 40, whereby the pressurized air compresses the interior of ink reservoir 10 via sealing part 24 in a manner similar to the above. Here, reference numeral 30 designates a correction fluid (or ink, application liquid), and 32 designates a follower that follows the correction fluid or the like. Additionally, pressurizing mechanism 22 is configured such that ballpoint pen tip 12 of refill unit 14 is retracted into barrel 18 when protrusion by clicking mechanism 20 is cancelled, and in this state the pressurized state in refill 10 is also released.

Figure 8:
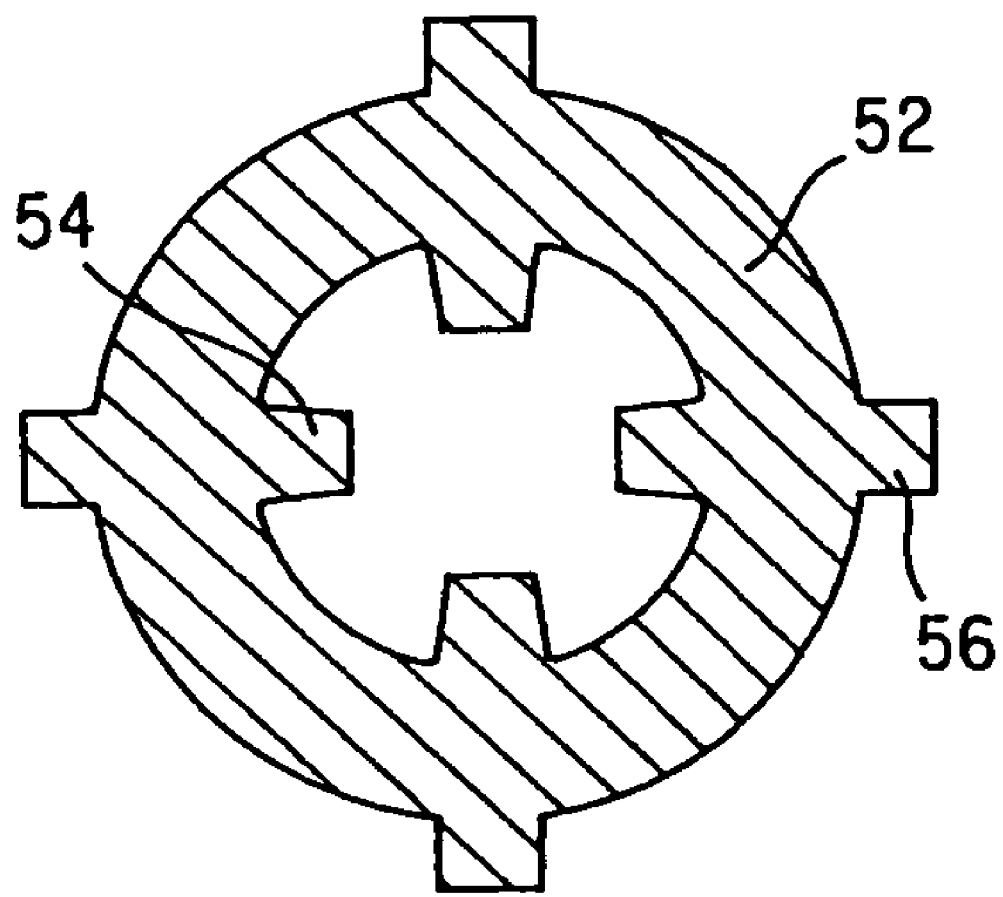
FIG. 8 is a sectional view cut along line C-C.
Figure 9:
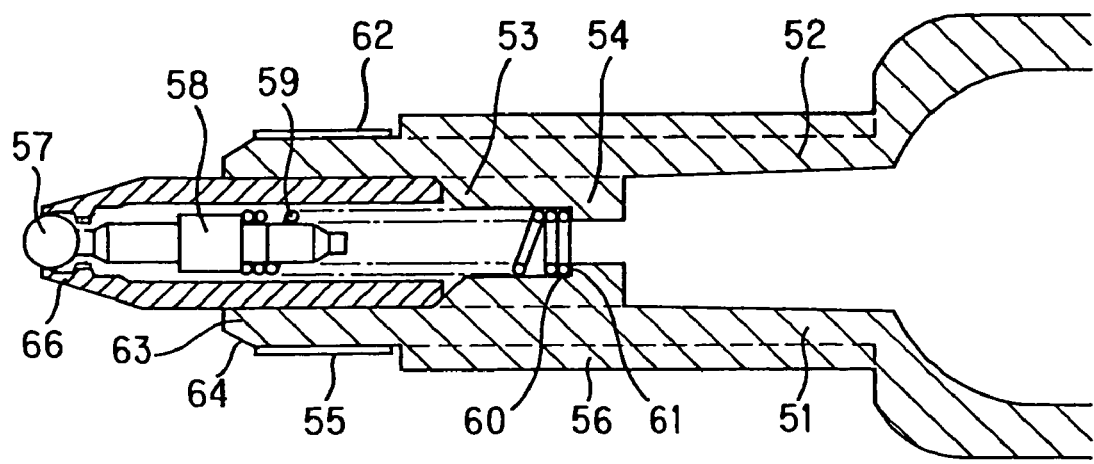
FIG. 9 is a sectional view of an essential part of a refill unit according to the first embodiment of the present invention.

Ink reservoir 10 of refill unit 14 is constructed of a molded article of a typical resin such as polypropylene, polyamide and the like, and if the applicator is a correction pen, it is configured of a refill for a correction pen of any of the first to third inventions, and is configured such that as shown in FIGS. 7 to 9 a front end part 51 is narrowed forming a sleeve 52 having a smaller diameter than that of the rear part of ink reservoir 10 while a multiple number of ribs 54 forming a receiving seat 53 for tip 12 to be press fitted are formed halfway inside the sleeve 52. Additionally formed at appropriate positions on the outside of the sleeve 52 are a multiple number of ribs 56 for receiving and fixing a metal tube 55 that is fixed to cover by being press fitted from the front end of sleeve 52.

A ball 57 at the top of tip 12 is repulsively urged by spring 59 via a pressing rod 58 such that the ball 57 comes into tight contact with a caulked inner surface 66 at the front end to cause an airtight condition. One end face 60 of spring 59 is directly received by a receiver 61, which is cut partway into ribs 54 on the inside of sleeve 52 of ink reservoir 10.

Figure 10:
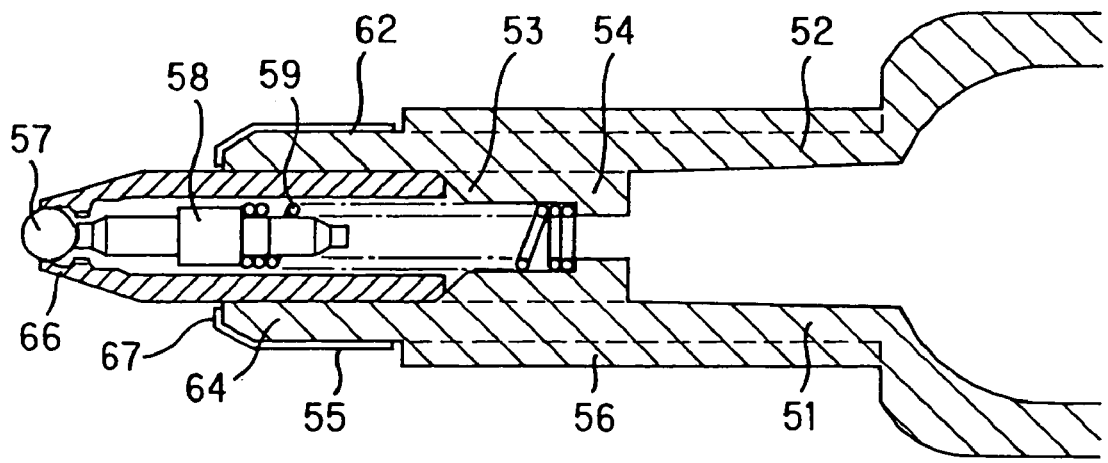
FIG. 10 is a sectional view of an essential part of a refill unit according to the second embodiment of the present invention.

The metal tube 55 that is fixed by being press fitted to cover the outer periphery 62 of sleeve 52 may comprise a typical metal such as aluminum, stainless steel and the like and may have a simple annular form or be formed in such a shape that one end face 67 is made narrow so as to cover the end face 64 of a tip attachment portion 63 at the front end of sleeve 52 of ink reservoir 10, as shown in FIG. 10.

Figure 11:
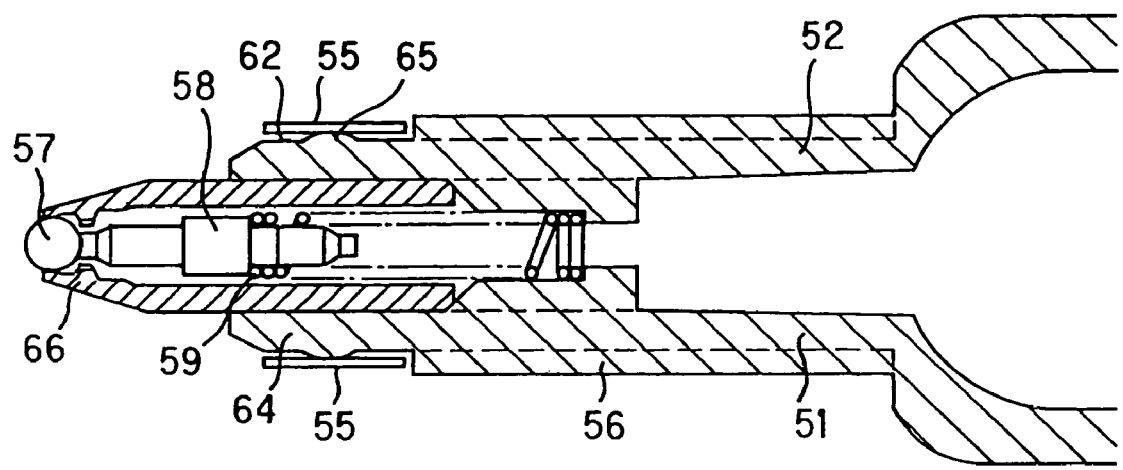
FIG. 11 is a sectional view of an essential part of a refill unit according to the third embodiment of the present invention.
Figure 12:
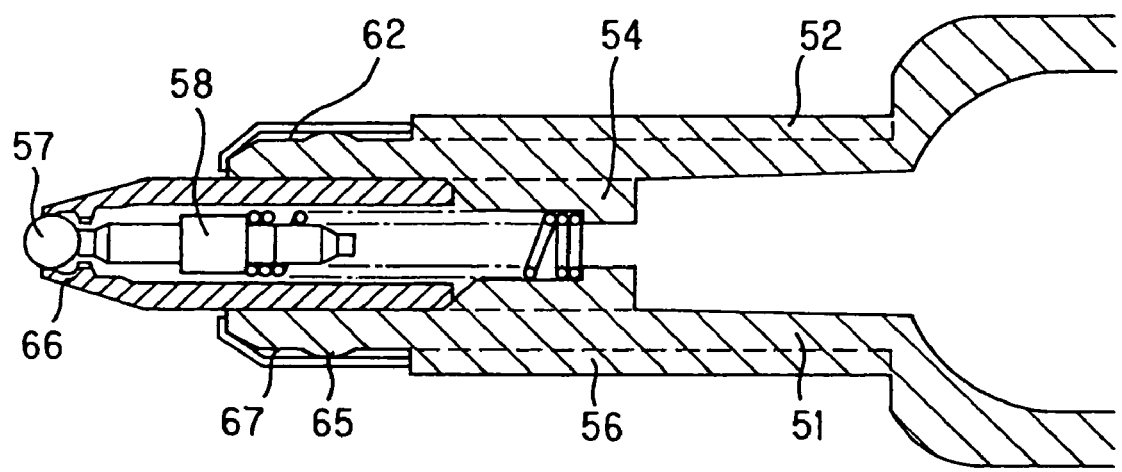
FIG. 12 is a sectional view of an essential part of a refill unit according to the fourth embodiment of the present invention.

Alternatively, as shown in FIG. 11, an annular projection or undercut 65 may be formed on outer periphery 62 of sleeve 52 of ink reservoir 10, at a position where metal tube 55 is press fitted such that the metal cover is squeezed principally over the projection or undercut 65. Further, in a configuration with projection or undercut 65, one end face 67 is made narrow like that shown in FIG. 10 so as to cover end face 64 of front tip attachment portion 63 of sleeve 52 of ink reservoir 10, as shown in FIG. 12.

The thus constructed refill unit of the present invention is able to fully prevent the tip from dropping off as well as to prevent leaking of ink, correction fluid, application fluid or the like, against the internal stress of the front part of the ink reservoir to which the tip is directly press fitted or the pressing force acting on the ballpoint pen tip during application, and against the force that would cause the tip to slip out from the ink reservoir, such as pressurizing force from the rear end of the ink reservoir, as well as against lowering of the force of squeezing the tip with the passage of time.

In addition, since the refill unit of the present invention is constructed such that the tip is directly press fitted into the ink reservoir without using any tip holder, it is possible to reduce parts in number and also have the advantage of processing accuracy and assembly precision.

Further, since the tip is designed to be directly press fitted to the ink reservoir, this configuration also has the effect of permitting the ink or the correction fluid stored in the ink reservoir having visibility to be monitored until its level reaches the tip attachment portion.

Moreover, since the metal tube is squeezed and fixed to cover the outer peripheral surface of the tip attachment portion of the ink reservoir, it is also possible to secure tight sealing at the tip fitted surface of the ink reservoir, hence to keep the ink or the correction fluid stable.

Still more, construction of the ink reservoir with any of the refills for a correction pen of the above first to third inventions can not only produce the above effects but also provide a refill for a correction pen unit excellent in solvent resistance and excellent in visibility (so as to make the correction fluid of the content and its remaining amount easily visible during usage and as time passes) and in moldability.

EXAMPLES

Next, the present invention shall be further described in detail with reference to the specific examples, the present invention, however, shall not be limited by the following examples.

Examples 1-17 and Comparative Examples 1-2

With the resins specified as follows, respective refills for a correction pen were produced by various methods.

Example 1

A tube having an outer diameter of 8 mm and an inner diameter of 6 mm with a wall thickness of 1 mm was extrusion molded from Nylon MXD6 (manufactured by MITSUBISHI GAS CHEMICAL COMPANY, LTD., the same hereinbelow) to form a refill for a correction pen of 70 mm long.

Example 2

A tube having an outer diameter of 8 mm and an inner diameter of 6 mm with a wall thickness of 1 mm was extrusion molded from TROGAMID T5000 (manufactured by Daicel-Huels, Ltd.) to form a refill for a correction pen of 70 mm long.

Example 3

A tube having an outer diameter of 8 mm and an inner diameter of 6 mm with a wall thickness of 1 mm was extrusion molded from TROGAMID CX-7323 (manufactured by Daicel-Huels, Ltd.) to form a refill for a correction pen of 70 mm long.

Example 4

A tube having an outer diameter of 8 mm and an inner diameter of 6 mm with a wall thickness of 1 mm was injection molded from NOVAMID X21 (manufactured by Mitsubishi Engineering-Plastics Corporation, the same hereinbelow) to form a refill for a correction pen of 70 mm long.

Example 5

A tube having an outer diameter of 8 mm and an inner diameter of 6 mm with a wall thickness of 1 mm was injection molded from a blend of Nylon 6 and NOVAMID X21 in an ratio of 30 wt %:70 wt % to form a refill for a correction pen of 70 mm long.

Example 6

A tube having an outer diameter of 8 mm and an inner diameter of 6 mm with a wall thickness of 1 mm was extrusion molded from a blend of Nylon 12 and Nylon MXD6 in a ratio of 30 wt %:70 wt % to form a refill for a correction pen of 70 mm long.

Example 7

A tube having an outer diameter of 8 mm and an inner diameter of 6 mm with a wall thickness of 1 mm was injection molded from a blend of Nylon 6, NOVAMID X21 and Nylon MXD6 in a ratio of 20 wt %:40 wt %:40 wt % to form a refill for a correction pen of 70 mm long.

Example 8

A tube having an outer diameter of 8 mm and an inner diameter of 6 mm with a wall thickness of 1 mm was injection molded from a blend of Nylon 6 and NOVAMID X21 in a ratio of 20 wt %:80 wt % to form a refill for a correction pen of 70 mm long.

Example 9

A tube having an outer diameter of 8 mm and an inner diameter of 6 mm with a wall thickness of 1 mm was injection molded from a blend of Nylon 12, NOVAMID X21 and Nylon MXD6 in a ratio of 10 wt %:40 wt %:50 wt % to form a refill for a correction pen of 70 mm long.

Example 10

A tube constituted of two layers of two kinds of resin [outer layer: Nylon 6/inner layer: NOVAMID X21=0.9 mm/0.1 mm] having an outer diameter of 8 mm and an inner diameter of 6 mm with a wall thickness of 1 mm was formed by co-injection molding to form a refill for a correction pen of 70 mm long. The water vapor permeability of Nylon 6 was 47 g/m$^2$·day/25 μm (40° C., 90% RH)(the same also in examples 11 and 12).

Example 11

A tube constituted of two layers of two kinds of resins [outer layer: Nylon 6/inner layer: Nylon MXD6=0.9 mm/0.1 mm] having an outer diameter of 8 mm and an inner diameter of 6 mm with a wall thickness of 1 mm was formed by co-extrusion molding to form a refill for a correction pen of 70 mm long.

Example 12

A tube constituted of two layers of two kinds of resins [outer layer: Nylon 6/inner layer: TROGAMID T5000=0.9 mm/0.1 mm] having an outer diameter of 8 mm and an inner diameter of 6 mm with a wall thickness of 1 mm was formed by co-extrusion molding to form a refill for a correction pen of 70 mm long.

Example 13

A tube constituted of four layers of four kinds of resins [the outermost layer: polypropylene/adhesive layer: modified PP resin/Nylon 6/innermost layer: NOVAMID X21=0.2 mm/0.01 mm/0.69 mm/0.1 mm] having an outer diameter of 8 mm and an inner diameter of 6 mm with a wall thickness of 1 mm was formed by co-injection molding to form a refill for a correction pen of 70 mm long.

As the above adhesive layer (modified PP resin), MODIC 502 manufactured by Mitsubishi Chemical Corporation (the same hereinbelow) was used. The water vapor permeability of polypropylene was 1.6 g/m$^2$·day/25 μm (40° C., 90% RH) (the same also in examples 14 and 16).

Example 14

A tube constituted of four layers of four kinds of resins [the outermost layer: polypropylene/adhesive layer: modified PP resin/intermediate layer: EVOH:EP-H101 (manufactured by KURARAY CO., LTD., ethylene mol ratio of 38 mol %)/innermost layer: NOVAMID X21=0.2 mm/0.01 mm/0.69 mm/0.1 mm] having an outer diameter of 8 mm and an inner diameter of 6 mm with a wall thickness of 1 mm was formed by co-extrusion molding to form a refill for a correction pen of 70 mm long.

Example 15

A tube constituted of three layers of three kinds of resins [the outermost layer: EVOH EP-E105 (manufactured by KURARAY CO., LTD., ethylene mol ratio of 44 mol %)/adhesive layer: modified PP resin/innermost layer: NOVAMID X21=0.89 mm/0.01 mm/0.1 mm] having an outer diameter of 8 mm and an inner diameter of 6 mm with a wall thickness of 1 mm was formed by co-injection molding to form a refill for a correction pen of 70 mm long. The water vapor permeability of EVOH was 38 g/m$^2$·day/25 μm (40° C., 90% RH).

Example 16

A tube constituted of five layers of four kinds of resins [the outermost layer: polypropylene/adhesive layer: modified PP resin/EVOH; EP-E105 (manufactured by KURARAY CO., LTD., ethylene mol ratio of 44 mol %)/adhesive layer: modified PP resin/innermost layer: TROGAMID T1500=0.68 mm/0.01 mm/0.2 mm/0.01 mm/0.1 mm] having an outer diameter of 8 mm and an inner diameter of 6 mm with a wall thickness of 1 mm was formed by co-extrusion molding to form a refill for a correction pen of 70 mm long.

Example 17

A tube constituted of five layers of four kinds of resins [the outermost layer: poly-cyclicolefin; ZEONOR1020R (manufactured by TOHCELLO CO., LTD.)/adhesive layer: modified PP resin/EVOH EP-E105 (manufactured by KURARAY CO., LTD., ethylene mol ratio of 44 mol %)/adhesive: modified PP resin/innermost layer: NOVAMID X21=0.68 mm/0.01 mm/0.2 mm/0.01 mm/0.1 mm] having an outer diameter of 8 mm and an inner diameter of 6 mm with a wall thickness of 1 mm was formed by co-injection molding to form a refill for a correction pen of 70 mm long.

The water vapor permeability of poly-cyclicolefin was 0.5 g/m$^2$·day/25 μm (40° C., 90% RH).

Comparative Example 1

A tube having an outer diameter of 8 mm and an inner diameter of 6 mm with a wall thickness of 1 mm was extrusion molded from Nylon 12 to form a refill for a correction pen of 70 mm long.

Comparative Example 2

A tube having an outer diameter of 8 mm and an inner diameter of 6 mm with a wall thickness of 1 mm was extrusion molded from Nylon 66 to form a refill for a correction pen of 70 mm long.

Each refill for a correction pen obtained from the above was filled up with about 1.5 g of a correction fluid having a blend composition and viscosity as follows. Then, 0.4 g of a follower having a blend composition and viscosity as follows was charged so as to be placed in contact with the rear end of the correction fluid to produce each correction pen conforming to FIG. 1.

(Correction Fluid Blend Composition)

| | |
|---|---|
| methyl cyclohexane | 40 parts |
| acrylic resin | 10 parts |
| titanium dioxide | 49 parts |
| powder silica | 1 part |

(Correction Fluid Follower Blend Composition)

| | |
|---|---|
| ethylene oxide 13 mol adduct of diglycerin | 95 parts |
| fine powder slica | 5 parts |

A viscosity (25° C.) of the correction fluid was measured by means of a viscometer (manufactured by TOKI SANGYO CO., LTD.) to determine to be 5000 mP·s at 1 rpm. The viscosity of the correction fluid follower (25° C.) was 10,000 mP·s at 1 rpm.

Each correction pen thus obtained was evaluated as to solvent resistance and clear drain ability by the following evaluation method.

The results are shown in following Table 1.

(Evaluation Method of Solvent Resistance)

The correction pens obtained as above were left standing at 25° C., 65% RH in an environment test room for one month and then each pen was visually evaluated as to solvent resistance based on the following evaluation criteria.

Evaluation Criteria:
◯: No change is observed in the refill.
Δ: Some change is observed in the refill.
X: Change is observed in the refill.

(Evaluation Method of Clear Drain Ability)

The correction pens obtained as above were left standing at 50° C., 65% RH in an environment test room for one month and then each pen was visually evaluated as to clear drain ability based on the following evaluation criteria.

Evaluation Criteria:
◯: The refill is clear without any change and the remaining amount can be easily monitored.
Δ: Some change is observed in the refill with slight opacity so that the remaining amount can be barely monitored.
X: Change is observed in the refill with opacity so that the remaining amount cannot be monitored.

TABLE 1

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Solvent resistance | ◯ | ◯ | ◯ | ◯ | ◯ | ◯ | ◯ | ◯ | ◯ | ◯ | ◯ |
| Clear drain ability | ◯ | ◯ | ◯ | ◯ | ◯ | ◯ | ◯ | ◯ | ◯ | ◯ | ◯ |

| | Examples | | | | | | Comparative examples | |
|---|---|---|---|---|---|---|---|---|
| | 12 | 13 | 14 | 15 | 16 | 17 | 1 | 2 |
| Solvent resistance | ◯ | ◯ | ◯ | ◯ | ◯ | ◯ | ◯ | ◯ |
| Clear drain ability | ◯ | ◯ | ◯ | ◯ | ◯ | ◯ | X | X |

As apparent from the results shown in Table 1 above, it has been found that examples 1-17 falling within the scope of the present invention are advantageous as to solvent resistance and clear drain ability over comparative examples 1-2 which fall outside the scope of the invention.

INDUSTRIAL APPLICABILITY

The refill for a correction pen of the present invention is excellent in solvent resistance and in visibility (so as to make the correction fluid of the content and its remaining amount easily visible during usage and as time passes) and in moldability.

Further, in the refill unit of the present invention, it is possible to fully prevent the tip from dropping off as well as to prevent leaking of the correction fluid, ink or the like, against the internal stress of the front part of the ink reservoir to which the tip is directly press fitted or the pressing force acting on the ballpoint pen tip during application, and against the force that would cause the tip to drop off from the ink reservoir, such as pressurizing force from the rear end of the ink reservoir, as well as against lowering of the force of squeezing the tip with the passage of time.

The invention claimed is:

1. A refill for a correction pen storing a correction fluid having at least methyl cyclohexane as the main solvent, characterized in that the refill for the correction pen is constructed of a molded article of a polyamide resin obtained from monomers having an aromatic ring or a naphthene ring.

2. A refill for a correction pen storing a correction fluid having at least methyl cyclohexane as the main solvent, characterized in that the refill for the correction pen is constructed of a molded article of a blend of at least two kinds of polyamide resins, wherein one kind of polyamide resin is one that has at least one of an aromatic ring and a naphthene ring in the principal chain.

3. The refill for a correction pen as described in claim 2, wherein a blend of an aliphatic base polyamide resin and a polyamide resin having at least one of an aromatic ring and a naphthene ring in the principal chain is used.

4. The refill for a correction pen as described in claim 2, wherein a polyamide resin having at least one of an aromatic ring and/or and a naphthene ring in the principal chain is blended in an amount of 5 to 100% by weight.

5. A refill for a correction pen storing a correction fluid having at least methyl cyclohexane as the main solvent, characterized in that the refill for the correction pen is configured of a multi-layered structure having two or more layers and the innermost layer in contact with the correction fluid is constituted of a polyamide resin, wherein the polyamide resin layer of the innermost layer is constituted of an aliphatic polyamide resin having at least one of an aromatic ring and a naphthene ring in the principal chain.

6. The refill for a correction pen as described in claim 5, wherein the structure comprises at least one layer of ethylene-vinyl alcohol copolymers.

7. The refill for a correction pen as described in claim 6, wherein the outermost layer is constituted of a polymer layer having a water vapor permeability of 5 g/m2·day/25 μm (40° C., 90% RH) or less.

8. The refill for a correction pen as described in claim 7, wherein the outermost layer is constituted of a polypropylene or a polycyclic olefin.

9. The refill for a correction pen as described in claim 7, wherein a thickness of the polyamide resin layer of the innermost layer is 0.01 to 2 mm.

10. The refill for a correction pen as described in claim 6, wherein a mol ratio of ethylene in the ethylene-vinyl alcohol copolymers is 10 to 60 mol %.

11. The refill for a correction pen as described in claim 10, wherein the outermost layer is constituted of a polymer layer having a water vapor permeability of 5 g/m2·day/25 μm (40° C., 90% RH) or less.

12. The refill for a correction pen as described in claim 11, wherein the outermost layer is constituted of a polypropylene or a polycyclic olefin.

13. The refill for a correction pen as described in claim 11, wherein a thickness of the polyamide resin layer of the innermost layer is 0.01 to 2 mm.

14. The refill for a correction pen as described in claim 5, wherein an outermost layer is constituted of a polymer layer having a water vapor permeability of 5 g/m2·day/25 μm (40° C., 90% RH) or less.

15. The refill for a correction pen as described in claim 14, wherein a thickness of the polyamide resin layer of the innermost layer is 0.01 to 2 mm.

16. The refill for a correction pen as described in claim 14, wherein the outermost layer is constituted of a polypropylene or a polycyclic olefin.

17. The refill for a correction pen as described in claim 16, wherein a thickness of the polyamide resin layer of the innermost layer is 0.01 to 2 mm.

18. The refill for a correction pen as described in claim 5, wherein a thickness of the polyamide resin layer of the innermost layer is 0.01 to 2 mm.

19. A refill for a correction pen as described in claim 5, wherein the multi-layered refill for a correction pen is produced by co-extrusion, injection molding or blow molding.

20. A refill unit comprising an applying part at the front end and an ink reservoir at the rear, wherein the refill unit is mounted in a barrel so as to be urged to the rear by a first spring;

a clicking mechanism provided at the rear end of the barrel;

the applying part of the refill unit is adapted to be able to project and retract in link with protruding and protrusion-canceling actions by the clicking mechanism;

the ink reservoir of the refill unit is made open at the rear end, and the barrel is provided with a pressurizing mechanism for enhancing the inner pressure of the ink reservoir arranged between the rear end of the ink reservoir and the clicking mechanism; and, the pressurizing mechanism comprises a sealing part, a front-end open sleeve and a second spring for repulsively urging the sealing part and sleeve in mutually separating directions; and when the refill unit is pushed back by pressing the top of the applying part projected from barrel after the protruding action of the clicking mechanism is done, the sleeve of the pressurizing mechanism advances relative to the sealing part to thereby compress the air inside the ink reservoir, and wherein the refill unit is characterized in that the applying part is formed by press fitting the rear end of a ballpoint pen tip having a rotatable ball to an attachment portion at the front end of the ink reservoir and that a metal tube is squeezed to cover the outer periphery of the attachment portion at the front end of the ink reservoir to which the tip is fitted.

21. The refill unit as described in claim 20, wherein the ballpoint pen tip has a metal ball at the front end and is constituted such that the ball is pressed from the backside thereof by a pressing means comprising a spring element so as to bring the ball into tight contact with an inner rim of a ball holding portion at the front end of the tip.

22. The refill unit as described in claim 21, wherein the metal tube includes a narrowed end face squeezed and fixed over the outer periphery of the attachment portion at the front end of the ink reservoir to which the tip is press fitted so as to cover the end face of the attachment portion at the front end of the ink reservoir.

23. The refill unit as described in claim 22, wherein the metal tube is squeezed and fixed to a projection or undercut formed on the outer periphery of the attachment portion at the front end of the ink reservoir to which the tip is press fitted.

24. The refill unit as described in claim 21, wherein the metal tube is squeezed and fixed to a projection or undercut formed on the outer periphery of the attachment portion at the front end of the ink reservoir to which the tip is press fitted.

25. The refill unit as described in claim 20, wherein the metal tube includes a narrowed end face squeezed and fixed over the outer periphery of the attachment portion at the front end of the ink reservoir to which the tip is press fitted so as to cover the end face of the attachment portion at the front end of the ink reservoir.

26. The refill unit as described in claim 25, wherein the metal tube is squeezed and fixed to a projection or undercut formed on the outer periphery of the attachment portion at the front end of the ink reservoir to which the tip is press fitted.

27. The refill unit as described in claim 20, wherein the metal tube is squeezed and fixed to a projection or undercut formed on the outer periphery of the attachment portion at the front end of the ink reservoir to which the tip is press fitted.

* * * * *